Figure 1:
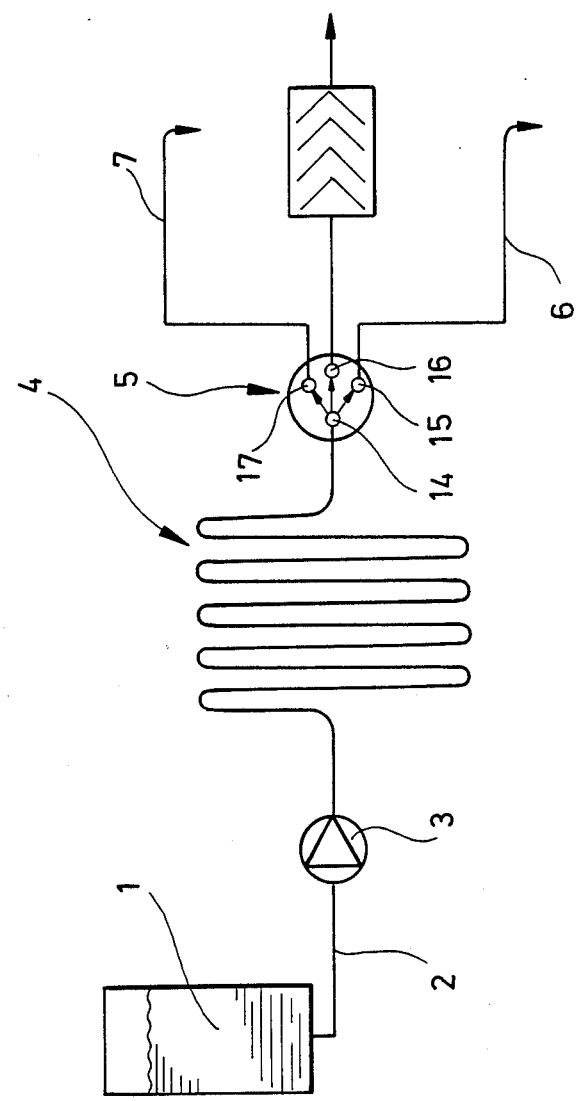

United States Patent [19]

Eugster

[11] Patent Number: 4,947,738
[45] Date of Patent: Aug. 14, 1990

[54] APPARATUS FOR PREPARING HOT BEVERAGES

[75] Inventor: Arthur Eugster, Romanshorn, Switzerland

[73] Assignee: Arthur Eugster AG, Romanshorn, Switzerland

[21] Appl. No.: 236,538

[22] Filed: Aug. 25, 1988

[30] Foreign Application Priority Data

Sep. 16, 1987 [EP] European Pat. Off. ............ 87113567

[51] Int. Cl.$^5$ ............................................. A47J 31/46
[52] U.S. Cl. ........................................ 99/293; 99/300; 137/625.46
[58] Field of Search ................. 99/288, 284, 290, 293, 99/294, 300, 279; 137/625.46; 426/433

[56] References Cited

U.S. PATENT DOCUMENTS

| 4,204,465 | 5/1980 | Knecht | 99/295 |
| 4,224,958 | 9/1980 | Kaplan | 137/625.46 |
| 4,603,620 | 8/1986 | Daugherty | 99/300 |
| 4,632,024 | 12/1986 | Cortese | 99/293 |

Primary Examiner—Robert W. Jenkins
Attorney, Agent, or Firm—Darby & Darby

[57] ABSTRACT

Apparatus of this type, for instance Espresso machines, comprising a plurality of preparation devices such as a coffee filter, a foaming nozzle or the like, are equipped with a multiple-way valve operable to supply hot water or hot steam to the various preparation devices. Conventional valves of this type are not sufficiently resistant against the corrosive action of the hot and frequently also aggressive water.

In the apparatus according to the invention, the multiple-way valve (5) is formed as a ceramic valve comprising a number of ceramic discs (11 to 13) provided with distributor passages (14, 15, 16, 17, 23) and mounted in sealing surface contact for displacement relative to one another.

The apparatus is suitable for the preparation of hot beverages, particularly Espresso.

17 Claims, 4 Drawing Sheets

APPARATUS FOR PREPARING HOT BEVERAGES

The invention relates to an apparatus for preparing hot beverages, particularly Espresso, comprising a water container, a heater, and a multiple-way valve disposed downstream of the heater and operable to supply hot water or hhot steam produced by said heater to individual preparation devices such as a coffee filter, a foaming nozzle or the like.

Apparatus of this type is generally known as Espresso machines. The multi-path valves, usually 4/3-way valves, employed therein are operable for either supplying the heated water to an Espresso-making section of the apparatus or for supplying hot steam to the foaming nozzle for heating and foaming milk for the subsequent preparation of Cappucino. In a third operative position the 4/3-way valve opens a passage leading to a drip pan or the like to thereby permit the steam in the heater to expand without supplying hot water or hot steam to any of the preparation devices.

Due to the high temperatures to which the 4/3-way valve is exposed, usually temperatures well above 100° C., the valve is subjected to considerable wear. At these high temperatures there is the tendency of lime to be precipitated from the water, as a result of which the operation of the valve will be impaired after some time.

It is therefore an object of the invention to improve an apparatus of the type defined in the introduction so as to ensure proper and reliable operation of the multiple-way valve over an extended period of time.

This object is attained according to the invention by an apparatus of the type defined above, wherein the multiple-way valve is a ceramic valve comprising ceramic discs mounted in sealing engagement with and rotatable relative to one another and formed with respective distributor passages.

This solution is very simple but still surprisingly effective. The ceramic discs are relatively resistant to the prevailing extreme temperatures. The ceramic material does not tend, moreover, to the formation of lime deposits thereon, so that the original cross-sectional area of the distributor passages does not alter over an extended period of use, resulting in a uniformly satisfactory operation of the apparatus over a long time.

In an advantageous embodiment of the invention, the multiple-way valve comprises concentrically mounted ceramic discs, a first ceramic disc acting as a distributor disc being formed with an open-anded inlet bore at its center, and with open-ended distributor bores spaced from one another at excentric positions at substantially equal radii. This disc is of a particularly simple construction, whereby its susceptibility to wear is still further reduced.

A second disc acting as a control disc mounted in sealing surface engagement with the first ceramic disc for rotation relative thereto about its center is advantageously formed with a distributor passage extending radially outwards from its center with its open side facing towards the distribution disc and having a length corresponding to the radial distance between the inlet bore and the distributor bores of the distributor disc. This construction results in a particularly simple operation of the valve. Hot water or steam enters the distributor passage of the control disc by way of the inlet bore of the distributor disc, is deflected radially outwards, and after a second deflection at the outer end of the distributor passage is redirected through a respective one of the distributor bores of the distributor disc communicating with a respctive one of the preparation devices.

In the case of particularly small ceramic discs, which are quite sufficient for the preparation devices in question, the first and second ceramic discs are advantageously non-rotatably retained along their outer perphery in respective cages mounted for rotation relative to one another. The rotation of the ceramic discs may thus be readily accomplished by rotating the cages, the handling of which is considerably simpler than that of the discs.

In a particularly simple construction, the cage of the distributor disc is of integral construction with the housing of the apparatus.

According to a preferred embodiment, a ceramic disc acting as a base disc may be disposed at the side of the control disc facing away from the distributor disc, the control disc being rotatable relative to the base disc. In this manner the control disc is rotatable between two ceramic discs, namely, the distributor disc and the base disc, so that the same conditions prevail on both sides of the control disc to thereby ensure effective operation over a long period of use.

A structurally simple mounting of the base disc is achieved when the base disc is non-rotatably retained along its outer periphery in a valve flange secured to the housing of the apparatus.

In a preferred embodiment, the distributor passage of the control disc is formed as a slot extending through the control disc. In this manner the surfaces of the base disc and the distributor disc facing towards the control disc are wetted with water, resulting in the formation of a water film between the relatively rotatable ceramic discs to thereby reduce the force required for operating the multiple-way valve.

In this context it is particularly advantageous to provide the mutually facing surfaces of the first, second and/or third ceramic discs with grease pockets in the form of flat annular segment-shaped recesses. These grease pockets contribute twofold to facilitating the handling an operation of the multiple-way valve. The formation of the grease pockets results in a reduction of the mutually contacting surface areas of the ceramic discs, and thus in a corresponding reduction of the friction of rest between the ceramic discs. The grease pockets may be filled with grease to thereby ensure the formation of a wafer-thin grease film on the mutually contacting surfaces of the ceramic discs to thereby facilitate the sliding displacement of the ceramic discs relative to one another even in the presence of hot steam. In this manner it is possible to guard against corrosion of the contact faces of the ceramic discs. To this purpose the recesses need only be rather shallow for containing a very small amount of grease sufficient for an effective continuous lubrication.

In contrast to the surfaces of the ceramic discs, the bottoms of the recesses have preferably a rough structure. In this manner the grease filled into the grease pockets is safely retained therein, so that only very small amounts of grease are supplied to the contacting surfaces of the ceramic discs.

The above noted advantages may alsready be obtained by the provision of a respective grease pocket on the distributor disc and the base disc.

The provision between the distributor disc and the housing of the apparatus of a honeycomb plastic gasket sealingly isolating the various passages from one another results not only in an effective sealing function, but also in the exertion by said gasket of a spring force to thereby ensure that the ceramic discs are always kept in effective contact with one another. The plastic gasket is preferably made of silicone rubber.

For the sealing effect, and above all for ensuring proper installation of the gasket, it is advantageous to provide the side of the housing facing towards the gasket as well as the distributor disc with respective recesses corresponding to the contour of the gasket for receiving the gasket therein in a snug fit.

The cage of the second ceramic disc, that is, of the control disc, is advantageously connected to a selector handle for actuating the control disc as required.

In this context it is of further advantage to provide the cage with detent means at locations corresponding to the distributor bores of the distributor disc. These detent means permit the valve to be readily and accurately adjusted to the desired position.

According to a preferred embodiment, the multiple-way valve is formed as a 4/3-way valve with three distributor bores in the distributor disc, a first bore leading to a hot water passage for the preparation of Espresso, a second bore leading to a hot steam passage for the foaming nozzle, and a third intermediate bore leading to a steam release passage opening into a collector receptacle.

Figure 2:
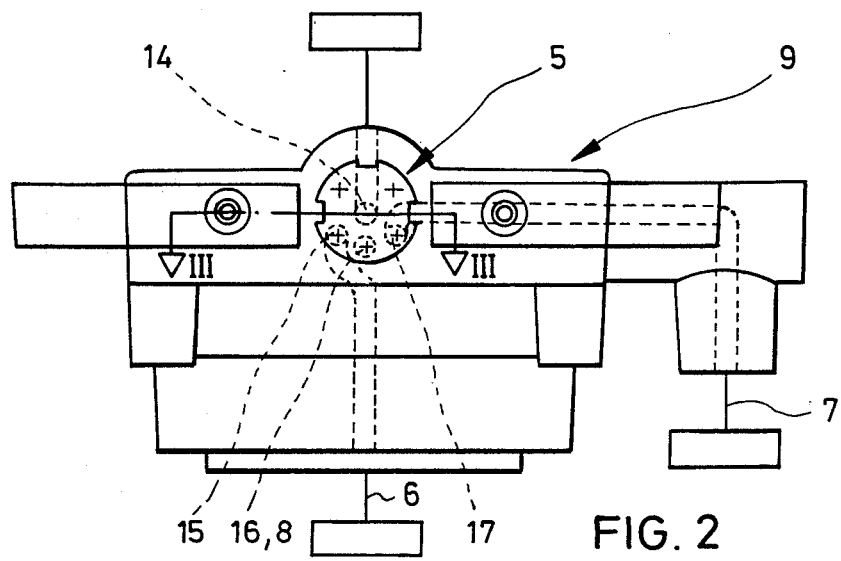
Figure 3:
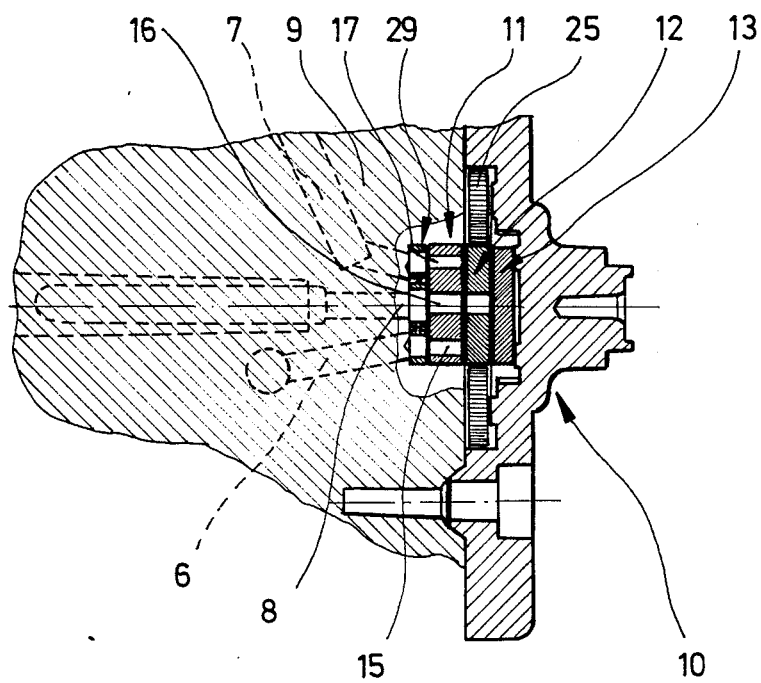
Figure 4:
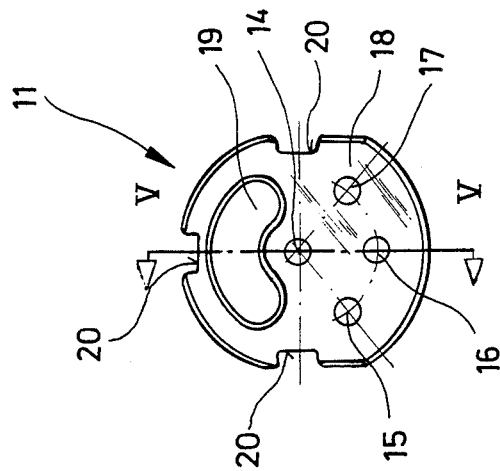
Figure 5:
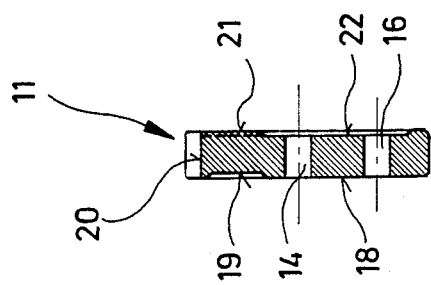
Figure 6:
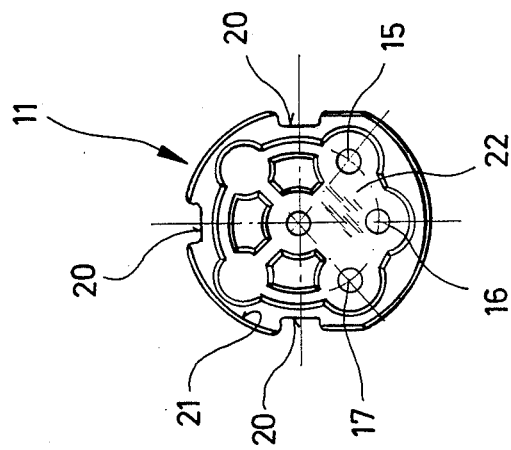
Figure 7:
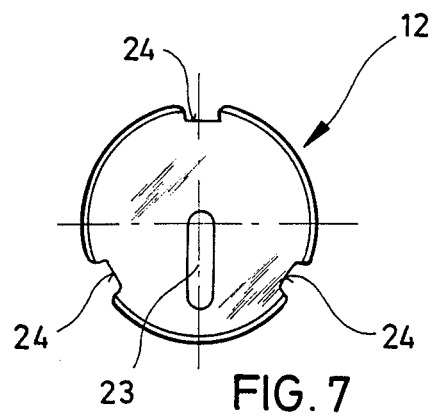
Figure 8:
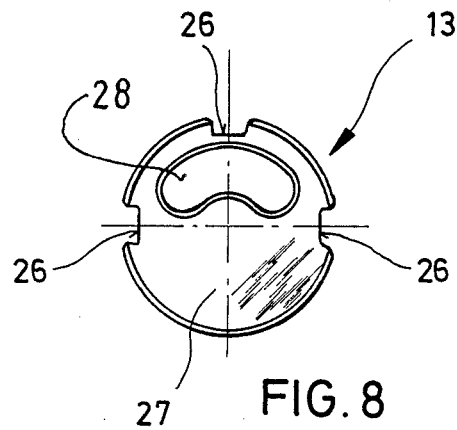
Figure 9:
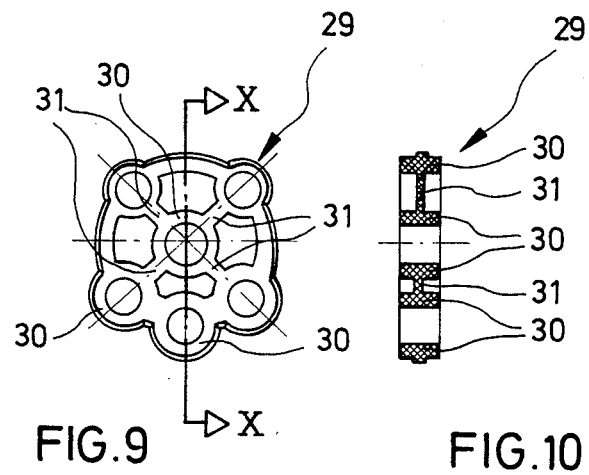
Figure 10:
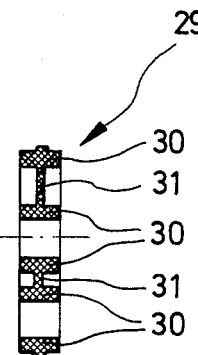

An embodiment of the invention shall now be described in detail by way of example with reference to the accompanying drawings, wherein:

FIG. 1 shows a diagram depicting the principle of apparatus according to the invention in the form of an Espresso machine, FIG. 2 shows a part of the housing of an apparatus according to the invention, FIG. 3 shows a horizontal sectional view of the housing of FIG. 2, taken along the line III—III, with unessential parts omitted, FIG. 4 shows a front view of a first ceramic disc acting as a distributor disc, FIG. 5 shows a sectional view of the disc of FIG. 4, taken along the line V—V, FIG. 6 shows a rear view of the ceramic disc of FIG. 4, FIG. 7 shows a front view of a ceramic disc acting as a control disc, FIG. 8 shows a front view of a ceramic disc acting as a base disc, FIG. 9 shows a front view of a plastic gasket, and FIG. 10 shows a sectional view of the plastic gasket of FIG. 9, taken along the line X—X.

Shown in FIG. 1 is a functional diagram of an Espresso machine. The machine comprises a water container 1 communicating with a heater 4 by way of a conduit 2 having a pump 3 disposed therein. Located downstream of heater 4 is a 4/3-way valve 5, that is, a valve having four connection points and three operative positions. A first outlet passage 6 of valve 5 leads to an Espresso-making device, i.e. to a ground coffee receptacle. A second passage 7 leads to a foaming nozzle used in a generally known manner for heating and foaming milk for making Capuccino. A third passage 8 acts as a steam release passage permitting the expansion and escape of steam still remaining in heater 4 after the preparation of the coffee. Thir passage 8 may open in a collecfing receptacle or drip pan (not shown for the sake of clarity).

FIG. 2 shows a housing 9 in which the individual passages 6,7,8 are formed and in which 4/3-way valve 5 is mounted.

As shown more clearly in FIG. 3, valve 5 is secured to housing 9 by means of a flange 10 not shown in FIG. 2 for the sake of clarity. From FIG. 3, which shows a cross-sectional view of housing 9 and flange 10, it is clearly evident that valve 5 comprises several ceramic discs 11, 12 and 13 mounted in sealing contact with one another for rotation relative to one another.

Description shall now be made at first of the individual ceramic discs. A first ceramic disc 11 shown in detail in FIGS. 4 to 6 acts as a distributor disc. Formed at the center of distributor disc 11 is an inlet bore 14 extending completely through disc 11 (cf. FIG. 5).

At spaced locations from its center, i.e. from inlet bore 14, disc 11 is provided with three distributor bores 15 to 17 disposed at equal radii and likewise formed as through-openings (cf. FIG. 5).

The contact surface of distributor disc 11, i.e. its front face 18, is particularly smoothly polished. In this manner front face 18 of distributor disc 11 forms a hermetic seal with the respective surface of second ceramic disc 12 without the provision of a separate gasket or the like.

As shown in FIG. 4, front face 18 of distributor disc 11 is formed with a shallow recess 19 serving as a grease pocket for containing a lubricating grease. In the front view of distributor disc 11, recess 19 is of a circular segment-shaped configuration. The recess 19 is effective to considerably reduce the contact surface area of ceramic disc 11, i.e. the area of front face 18 contacting the adjacent ceramic disc 12.

The periphery of ceramic disc 11 is provided with notches 20 for engagement with associated projections (not shown in detail) of housing 9. Housing 9 thus serves as a cage for non-rotatably retaining ceramic disc 11.

The rear face 21 of ceramic disc 11 is formed with a recess 22 corresponding to the contour of a gasket to be described as the description proceeds.

The second ceramic disc 12, in FIG. 3 the central disc, acts as a control disc, and is shown in detail in FIG. 7. Control disc 12 is likewise formed as a substantially circular and planar ceramic disc having a slot 23 extending therethrough. Slot 23 extends from the center of ceramic disc 12 radially outwards over a length corresponding to the radial distance between distributor bores 15 to 17 and inlet bore 14 of distributor disc 11. Slot 23 of control disc 12 thus serves for selectively communicating any of distributor bores 15 to 17 with inlet bore 14 of distributor disc 11. Control disc 12 has both its front and rear faces smoothly polished to facilitate its rotation relative to distributor disc 11 and to the third ceramic disc 13 to be described later. The outer periphery of control disc 12 is provided with notches 24 for the engagement of an actuating ring having respective projections (not shown in detail) (cf. FIG. 3). Actuating ring 25 is connected to a selector handle engaging actuating ring 25 through arcuate segment slots formed in flange 10. This selector handle has been omitted in the drawings for the sake of clarity.

FIG. 8 shows the third ceramic disc 13 depicted in FIG. 3 in contact with flange 10. The third ceramic disc acts as a base disc 13 and has its outer periphery formed with notches 26 for the engagement of respective projections (not shown) of flange 10, so that base disc 13 is non-rotatably retained relative to flange 10 and thus relative to housing 9.

As in the case of distributor disc 11, the front face 27 of base disc 13 facing towards control disc 12 is formed with a grease pocket 28 having the same shape as grease pocket 19 of distributor disc 11.

Shown in FIGS. 9 and 10 finally is a plastic gasket to be installed between housing 9 with the passages 6 to 8 formed therein and distributor disc 11 as shown in FIG. 3.

As shown in FIG. 9, plastic gasket 29 is substantially formed as a honeycomb structure and consists of a silicone rubber in the present example. The honeycomb structure is substantially composed of tubular portions 30 associated to bores 14 to 17 of distributor disc 11 and connected to one another by web portions 31. As shown in FIG. 10, tubular portions 30 are of a certain length which in combination with the silicone material of gasket 29 permits the latter to be resiliently compressed in the axial direction of ceramic discs 11 to 13. As a result of this resilient compression, the ceramic discs are always kept in mutual contact under slight pressure, thus permitting manufacturing tolerances to be accommodated.

The apparatus according to the invention operates as follows:

The assembly of 4/3-way valve 5 is initiated by placing silicone gasket 29 in housing 9. Subsequently distributor disc 11 is placed onto gasket 29 with the housing projections engaging notches 20, so that inlet bore 14 and distributor bores 15 to 17 are aligned with the respective tubular portions 30 of gasket 29. Base disc 13 is then mounted in flange 10 with the flange projections engaging notches 26. Subsequently actuating ring 25 is rotatably mounted in flange 10 in a manner permitting it to be engaged by the selector handle (not shown). Control disc 12 is then concentrically placed in actuating ring 25 so that its notches 24 are engaged by projections of the actuating ring to thereby connect actuating ring 25 non-rotatably to control disc 12. Flange 10 may then be bolted to housing 9, resulting in the assembled state of valve 5 as shown in FIG. 3. prior to assembly of the valve, grease pockets 19 and 28 of distributor disc 11 and base disc 13, respectively, have been filled with a food-compatible lubricant.

In use of the Espresso machine, water container 1 is at first filled with water. Pump 3 is operated to transfer the water via conduit 2 into heater 4, wherein it is heated to the desired temperature. The 4/3-way valve 5 is then operated for selectively preparing Espresso or for supplying hot steam for foaming and heating milk. To this purpose control disc 12 is rotated by means of the selecting handle connected to actuating ring 25, so that slot 23 of control disc 12 establishes communication between inlet bore 14 of distributor disc 11 and distributor bore 15 or distributor bore 17, respectively. When Espresso has thus been prepared, or when water container 1 is empty, control disc 12 is rotated to a position in which slot 23 of control disc 12 establishes communication between inlet bore 14 of distributor disc 11 and distributor bore 16 leading to steam release passage 8 of housing 9.

The provision of grease pockets 19 and 28 in distributor disc 11 and base disc 13, respectively, is effective to considerably reduce the contact surface areas of ceramic discs 11 to 13. As a result, a reduced force is required for rotating control disc 12 relative to distributor disc 11 and base disc 13. The force required for actuating valve 5 may be still further reduced by depositing a grease in grease pockets 19 and 28 to thereby form a wafer-thin grease film on the contact surfaces of ceramic discs 11–13. The roughened walls of grease pockets 19 and 28 permit only a minimum amount of grease to be released therefrom, so that the thus selected configuration of the grease pockets ensures continuous lubrication of the valve. The honeycomb silicone gasket 29 is advantageously effective to always keep ceramic discs 11 to 13 in surface contact with a gentle pressure without creating undue stresses in the material.

The not shown selector handle may be provided with detent means associated to individual distributor bores 15 to 17 of distributor disc 11, so that the valve is retained in selected operative positions and can only be displaced from these positions by the application of a certain force.

I claim:

1. Apparatus for preparing hot beverages, particularly espresso, comprising a water container, a heater, and a multiple-way valve disposed downstream of said heater and operable to supply hot water or hot steam produced in said heater to individual preparation devices such as a coffee filter or a foaming nozzle, said valve comprising ceramic discs mounted in sealing engagement with and rotatable relative to one another and provided with respective distribution passages, said ceramic discs having mutually incorporating surfaces, said surfaces of at least two of the ceramic disc being formed with grease pockets that are recessed and which facilitate a sliding displacement of the ceramic discs relative to one another and accommodate grease.

2. Apparatus according to claim 1, characterized in that said multiple-way valve comprises concentrically mounted ceramic discs (11,12,13), a first ceramic disc acting as a distributor disc (11) being formed with an open-ended inlet bore (14) at its center and with open-ended distributor bores (15,16,17) spaced from one another at excentric positions at substantially equal radii.

3. Apparatus according to any claim 2, characterized in that said first and second ceramic discs (11,12) are non-rotatably retained along their outer periphery in respective cages (9,25) mounted for rotation relative to one another.

4. Apparatus according to any of claim 3, characterized in that said cage of said distributor disc (11) is of integral construction with the housing (9) of the apparatus.

5. Apparatus according to claim 3, characterized in that said cage (25) of said control disc has a selector handle connected thereto.

6. Apparatus according to claim 5, characterized in that said cage and/or said selector handle are provided with detent means at locations corresponding to said distributor bores (15,16,17) of said distributor disc (11).

7. Apparatus according to claim 1, characterized in that a second ceramic disc acting as a control disc (12) mounted in sealing surface engagement with said first ceramic disc (11) for rotation relative thereto about its center is formed with a distributor passage 923) extending radially outwards from its center with its open side facing towards said distributor disc (11) and having a inlet bore (14) and said distributor bores (15,16,17) of said distributor disc (11).

8. Apparatus according to claim 7, characterized in that a third ceramic disc acting as a base disc (13) is disposed on the side of said control disc (12) facing away from said distributor disc (11), said control disc (12) being rotatable relative to said base disc (13)

9. Apparatus according to any of claim 8, characterized in that said base disc (13) is non-rotatably mounted at its outer periphery in a valve flange (10) secured to said housing (9) of the apparatus.

10. Apparatus according to claim 7, characterized in that said distributor passage of said control disc (12) is formed as a slot (23) extending through said control disc (12).

11. Apparatus according to claim 1, characterized in that said multiple-way valve (5) is formed as a 4/3-way valve having three distributor bores (15,16,17) in said distributor disc (11), the first distributor bore (15) leading to a hot water passage (6) for the preparation of Espresso, the second distributor bore (17) leading to a hot steam passage (7) for said foaming nozzle, and a third intermediate distributor bore (16) leading to a steam release passage (8) opening into a collector receptacle.

12. Apparatus according to claim 1, wherein said grease pockets have a bottom surface which is rougher than said mutually incorporating surfaces of said ceramic discs.

13. Apparatus according to claim 1, wherein said ceramic discs comprise first a distributor disc, second a control disc under said distributor disc, and third a base disc under said control disc, said grease pockets being formed in said distributor disc and in said base disc.

14. Apparatus according to claim 1, wherein the ceramic discs comprise a distributor disc being disposed in a housing, and further comprising a gasket provided between the distributor disc and said housing for isolating said distribution passages from one another.

15. Apparatus according to claim 14, wherein the housing has a side facing towards aid gasket, said side and said distributor disc being each formed with a recess of a shape corresponding to the contour of said gasket for receiving said gasket therein in a snug fit.

16. Apparatus according to claim 14, wherein said gasket is composed of a honeycomb plastic.

17. Apparatus according to claim 1, wherein said grease pockets are in the shape of flat annular segment-shaped recesses.

* * * * *